United States Patent [19]

Tzikas

[11] Patent Number: 4,463,174

[45] Date of Patent: Jul. 31, 1984

[54] PROCESS FOR PRODUCING DIBENZANTHRONE CONTAINING VAT DYES

[75] Inventor: Athanassios Tzikas, Pratteln, Switzerland

[73] Assignee: Ciba-Geigy Corporation, Ardsley, N.Y.

[21] Appl. No.: 421,578

[22] Filed: Sep. 22, 1982

[30] Foreign Application Priority Data

Sep. 28, 1981 [CH] Switzerland .......................... 6233/81

[51] Int. Cl.³ .................. C07D 413/12; C07D 413/14; C07D 321/10
[52] U.S. Cl. .................................... 544/131; 544/148; 546/194; 546/197; 546/270; 549/60; 549/348
[58] Field of Search ................ 544/131, 148; 546/194, 546/197, 270; 549/60, 348

[56] References Cited

U.S. PATENT DOCUMENTS 2,888,463  5/1959  Cohen ................................ 549/348

Primary Examiner—Robert W. Ramsuer
Attorney, Agent, or Firm—Wenderoth, Lind & Ponack

[57] ABSTRACT

Blue vat dyes are obtained by reaction of dihydroxydibenzanthrone and an aldehyde in chlorosulfonic acid. These dyes can be optionally chlorinated and/or substituted by sulfonamido groups. They are suitable in particular for dyeing cellulose fibres.

10 Claims, No Drawings

PROCESS FOR PRODUCING DIBENZANTHRONE CONTAINING VAT DYES

The present invention relates to a process for producing vat dyes, also to the dyes so far as they are novel, and to the use thereof for dyeing cellulose.

Subject matter of the invention is a process for producing vat dyes of the formula I

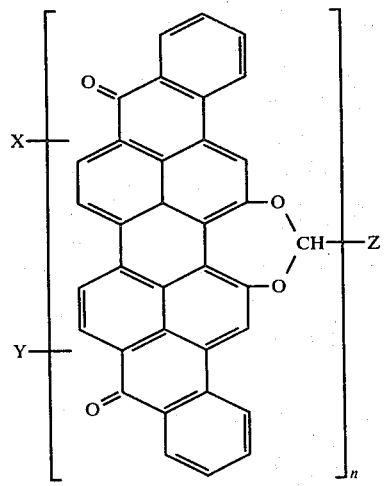

(I)

wherein
n is 1 or 2,
Z is H, unsubstituted or substituted alkyl, unsubstituted or substituted aryl or a heterocyclic radical, when n is 1, or a direct bond, unsubstituted or substituted alkylene, unsubstituted or substituted arylene or a heterocyclic radical, when n is 2,
X is H, Cl or a group of the formula —SO$_2$T, where T is the radical of an aliphatic or aromatic, primary or secondary amine, and
Y is H or Cl,
which process comprises condensing n equivalents of dihydroxydibenzanthrone of the formula II

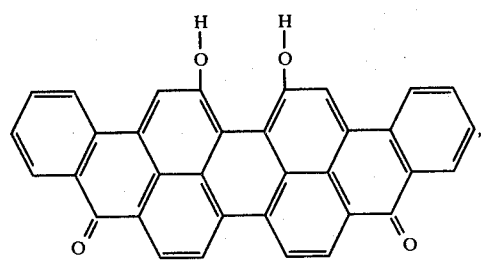

(II)

in chlorosulfonic acid, with an aldehyde of the formula III

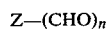  (III)

wherein Z and n have the meanings defined above, and subsequently, if dyes of the formula I in which X and/or Y are (is) not hydrogen are being produced, chlorinating the reaction product and/or reacting it with thionyl chloride and an amine of the formula IV

  (IV), where T has the meaning defined above.

The alkyl groups Z can be straight-chain or branched-chain and can also be substituted, for example by halogen, especially chlorine, C$_1$–C$_5$-alkoxy or phenyl. They preferably have 1 to 5 carbon atoms, and they are for example the following: methyl, ethyl, propyl, iso-propyl, n-butyl, tert-butyl, pentyl, chloromethyl, 2-chloroethyl, phenylmethyl or chlorophenylmethyl.

Aryl groups denoted by Z are for example phenyl or naphthyl groups, or these groups containing further fused-on rings, such as anthraquinonyl groups. All these groups can be mono- or polysubstituted, for example by C$_1$–C$_5$-alkyl, C$_1$–C$_5$-alkoxy, halogen, such as bromine or preferably chlorine, sulfo, nitro, amino, C$_1$–C$_5$-alkylamino or di-C$_1$–C$_5$alkylamino. Examples of such aryl groups are: phenyl, 1- or 2-naphthyl, 2-anthraquinonyl, o-, m- or p-C$_1$–C$_5$-alkylphenyl, o- or p-chlorophenyl, 2,4-dichlorophenyl, m-nitrophenyl, o-sulfophenyl, 2,4-disulfophenyl, p-aminophenyl, p-dimethylaminophenyl or p-N-methyl-N-(2-chloroethyl)-aminophenyl.

Heterocyclic radicals Z preferably are, if n is 1, pyridyl groups, such as 2-, 3- or 4-pyridyl, or furyl groups, such as 2-furyl; or, if n is 2, 2,5-thiophenylene. When n is 1, Z is preferably hydrogen, C$_1$–C$_3$-alkyl or phenyl, or phenyl substituted by methyl, chlorine, nitro, sulfo or amino.

When n is 2, Z is the direct bond, an unsubstituted or substituted alkylene or arylene group or an heterocyclic group. Examples are: ethylene, propylene, 1,3- or 1,4-phenylene, naphthylene and 2,5-thiophenylene. The preferred meaning of Z, when n is 2, is the direct bond, or 1,3- or 1,4-phenylene.

Where X is a group —SO$_2$—T, T is the radical of an aliphatic or aromatic, primary or secondary amine. Such amines are for example: C$_1$–C$_5$-alkylamines or C$_1$–C$_5$-dialkylamines, such as dimethylamine, diethylamine, isobutylamine, n-pentylamine or methylethylamine, and also these amines which are substituted by C$_1$–C$_5$-alkoxy or phenyl, or they are piperidine, morpholine, aniline, N-C$_1$–C$_5$-alkylaniline, or aniline substituted in the phenyl ring by C$_1$–C$_5$-alkyl, C$_1$–C$_5$-alkoxy, halogen, such as bromine or chlorine, nitro or sulfo. Preferred amines are dimethyl- or diethylamine, piperidine, morpholine, aniline or C$_1$–C$_5$-N-alkylaniline, and also aniline monosubstituted in the phenyl ring by chlorine, methyl or methoxy.

A preferred embodiment of the process according to the invention comprises a process for producing vat dyes of the formula V

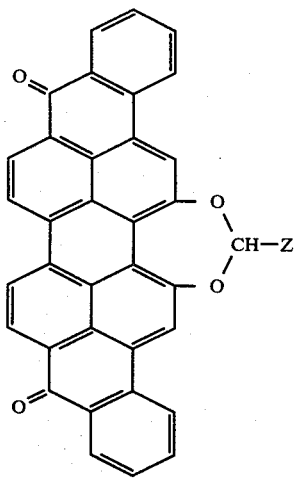

wherein Z is hydrogen, $C_1$–$C_3$-alkyl or phenyl, or phenyl substituted by methyl, chlorine, nitro, sulfo or amino, by reacting dihydroxydibenzanthrone of the formula II

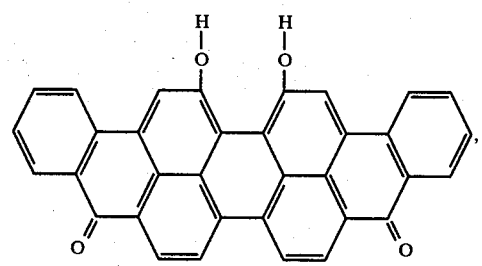

in chlorosulfonic acid, with an aldehyde of the formula VI

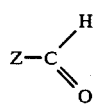

in which Z has the meaning defined above.

A further preferred embodiment of the process according to the invention comprises a process for producing vat dyes of the formula VII

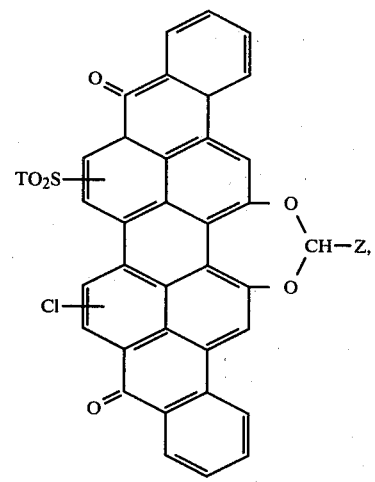

wherein Z is hydrogen, $C_1$–$C_3$-alkyl or phenyl, or phenyl substituted by methyl, chlorine, nitro, sulfo or amino, and T is the radical of dimethyl- or diethylamine, or piperidine, morpholine, aniline or $C_1$–$C_3$-N-alkylaniline, or aniline monosubstituted in the phenyl ring by chlorine, methyl or methoxy, by reacting dihydroxydibenzanthrone of the formula II

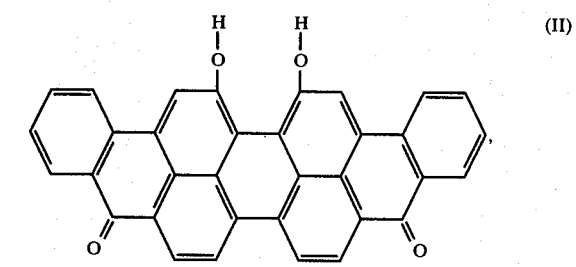

in chlorosulfonic acid, with an aldehyde of the formula VI

wherein Z has the meaning defined above, and, simultaneously or successively in any sequence, subsequently chlorinating the reaction product and reacting it with thionyl chloride, and finally reacting the product obtained with dimethyl- or diethylamine, piperidine, morpholine, aniline, $C_1$–$C_3$-N-alkylaniline, or aniline monosubstituted in the phenyl ring by chlorine, methyl or methoxy.

The reaction between dihydroxydibenzanthrone of the above-given formula II with an aldehyde of the formula III or VI is performed in chlorosulfonic acid. Aldehyde and dihydroxydibenzanthrone are preferably used in this case in approximately equivalent amounts. The amount of chlorosulfonic acid depends on the solubility of the starting and final products. The procedure in general is to introduce dihydroxydibenzanthrone into the approximately 3- to 4-fold amount of chlorosulfonic acid, and to subsequently add the aldehyde dropwise. The reaction temperature is maintained, by cooling, at between 0° and 30° C., preferably between 5° and 20° C.

The reaction mixture is afterwards poured into an ice/water mixture, whereupon the condensation product precipitates.

When it is required to produce dyes of the formula I wherein X and/or Y are (or is) chlorine, the chlorination is preferably carried out directly following the condensation reaction, without isolation of the condensation product, and the customary chlorinating agents can be used. Chlorine is preferably employed, optionally with the addition of catalytic amounts of iodine. The reaction temperature in this case is advantageously 10° to 25° C. The dye is subsequently isolated, as described above.

To produce dyes of the formula I wherein X is a group of the formula —SO$_2$T, where T is the radical of an aliphatic or aromatic, primary or secondary amine, there is preferably added thionyl chloride to the reaction solution containing the optionally chlorinated condensation product of dihydroxydibenzanthrone and aldehyde, and the temperature is raised to 40° to 90° C., preferably to 55° to 70° C. After a reaction time of about 1 to 3 hours, the reaction mixture is poured into an ice/water mixture, and the resulting sulfochloride of the dye is filtered off. This is then suspended in an ice/water mixture and reacted with the amine. There are used at least 2 mols of amine per mol of sulfochloride, preferably 2 to 2.5 mols. The temperature is subsequently raised to 40° to 90° C., preferably to 55° to 70° C., and the dye which has precipitated is filtered off.

Instead of using aldehyde in the process according to the invention, it is also possible to use derivatives of aldehydes, for example acetals; and dialkoxydibenzanthrones can be used in place of dihydroxydibenzanthrone.

A particular advantage of the process according to the invention is that the condensation of dihydroxydibenzanthrone with aldehyde, the chlorination and the sulfochlorination can be performed in the same solvent, namely chlorosulfonic acid, and without isolation of the intermediates.

Compared with the known process of condensation of dihydroxydibenzanthrone and aldehydes in concentrated sulfuric acid, the process according to the invention in chlorosulfonic acid has the surprising advantages that the reactions can be performed at a lower temperature, and that better yields are obtained. Furthermore, the process can be carried out in very much more highly concentrated solutions or suspensions, so that considerably less waste sulfuric acid has to be disposed of or reprocessed.

The dyes of the formula VIII

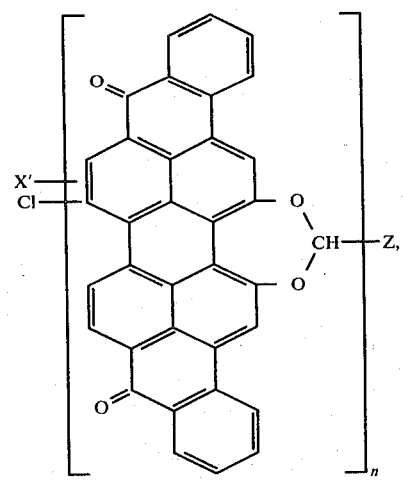

wherein
n is 1 or 2,
Z is H, unsubstituted or substituted alkyl, unsubstituted or substituted aryl or a heterocyclic radical, when n is 1, or a direct bond, unsubstituted or substituted alkylene, unsubstituted or substituted arylene or a heterocyclic radical, when n is 2,
X' is Cl, or a group of the formula —SO$_2$T, where T is the radical of an aliphatic or aromatic, primary or secondary amine,
are novel and form further subject matter of the present invention.

Preferred compounds among these are those wherein n is 1, Z is hydrogen, C$_1$–C$_3$-alkyl or phenyl, or phenyl substituted by methyl, chlorine, nitro, sulfo or amino, and T is the radical of dimethyl- or diethylamine, piperidine, morpholine, aniline or C$_1$–C$_3$-N-alkylaniline, or aniline monosubstituted in the phenyl ring by chlorine, methyl or methoxy.

The vat dyes of the formula I are suitable for dyeing and printing the most varied materials in blue shades, especially for dyeing and printing fibres formed from natural or regenerated cellulose, in the presence of reducing agents, for example dithionite.

The dyeings obtained are distinguished by good levellness. The fastness properties are in general very good, particularly fastness to light, water, chlorine and boiling soda.

The term 'parts' in the following Examples denotes parts by weight, percentages are percent by weight, and the temperature values are in degrees Centigrade.

EXAMPLE 1

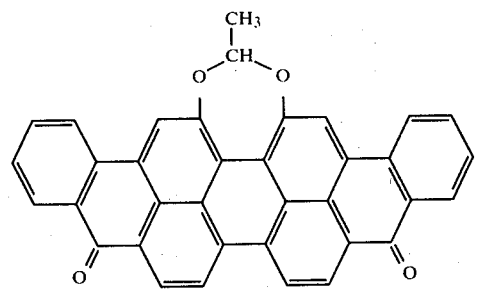

49 parts of dihydroxydibenzanthrone are introduced portionwise into 180 parts of chlorosulfonic acid at 5° C. in a manner ensuring that the temperature does not exceed 10° C. (about 20 minutes); and 18 parts of acetaldehyde are then added dropwise, the rate of addition being such that the temperature does not rise above 20° C. (about 15 minutes). The suspension is stirred at room temperature for 1 hour, and is subsequently poured into an ice/water mixture. The dye which has precipitated is filtered off, washed neutral with water, and dried at 80° C. in a vacuum drying chamber.

The yield is 51 parts of dye of the above-given structure, which dyes cotton in a navy blue shade.

EXAMPLE 2

When the procedure is carried out as described in Example 1 except that the 18 parts of acetaldehyde are replaced with 15 parts of formaldehyde/dimethyl acetal, there are obtained 50 parts of a vat dye of the formula

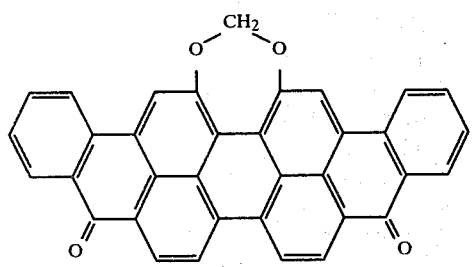

which dyes cotton in a navy blue shade.

EXAMPLES 3 TO 25

When the procedure is carried out in the manner described in Example 1 except that the 18 parts of acetaldehyde are replaced with equivalent amounts of aldehyde of the formula Z-CHO, wherein Z has the meanings given in column 2 of the following Table, there are obtained vat dyes of the formula

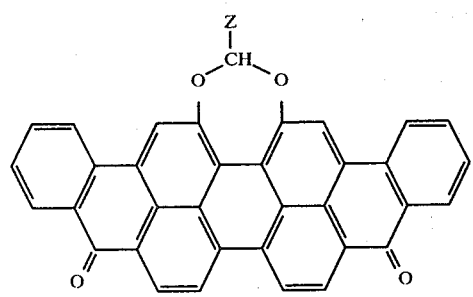

These dyes dye cotton in the shade given in each case in column 3 of the Table.

TABLE

| Example | Z | Shade on cotton |
|---|---|---|
| 3 | Cl—⟨C₆H₄⟩— | navy blue |
| 4 | (CH₃)₂N—⟨C₆H₄⟩— | navy blue |
| 5 | 2-SO₃H—C₆H₄— | neutral blue |
| 6 | CH₃CH₂— | navy blue |
| 7 | Cl—CH₂— | navy blue |
| 8 | Cl—CH₂—CH₂— | navy blue |
| 9 | 2-Cl—C₆H₄— | navy blue |
| 10 | 2,4-Cl₂—C₆H₃— | navy blue |
| 11 | C₆H₅— | neutral blue |
| 12 | 4-CH₃—C₆H₄— | neutral blue |
| 13 | 2-CH₃—C₆H₄— | neutral blue |
| 14 | 3-CH₃—C₆H₄— | neutral blue |
| 15 | C₆H₅—CH₂— | neutral blue |
| 16 | 1-naphthyl | neutral blue |
| 17 | 2-naphthyl | neutral blue |

TABLE-continued

| Example | Z | Shade on cotton |
|---|---|---|
| 18 | 4-H₂N-C₆H₄- | navy blue |
| 19 | 4-(CH₃CH₂)₂N-C₆H₄- | navy blue |
| 20 | 3-NO₂-C₆H₄- | navy blue |
| 21 | 4-(CH₃)(ClCH₂CH₂)N-C₆H₄- | navy blue |
| 22 | anthraquinon-2-yl | reddish blue |
| 23 | 2,4-disulfophenyl (SO₃H, HO₃S) | greenish blue |
| 24 | pyridin-2-yl | navy blue |
| 25 | furan-2-yl | navy blue |

EXAMPLE 26

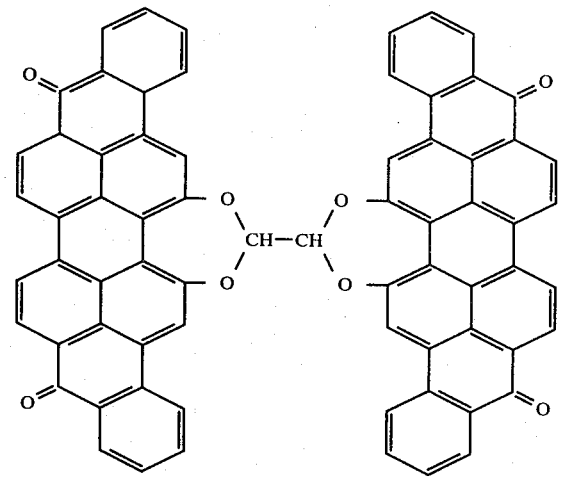

9.8 parts of dihydroxydibenzanthrone are introduced portionwise into 40 parts of chlorosulfonic acid at 5° C. in a manner ensuring that the temperature does not exceed 10° C. (about 20 minutes); and 1.4 parts of glyoxal (~40% solution in H₂O) are then added at such a rate that the temperature does not rise above 20° C. (about 15 minutes). The suspension is stirred at room temperature for 1 hour, and is subsequently poured into an ice/water mixture. The dye which has precipitated is filtered off, washed neutral with water, and dried at 80° C. in a vacuum drying chamber.

There are thus obtained 10 parts of the dye of the structure given above, which dyes cotton in navy blue shades.

EXAMPLES 27 TO 31

When the procedure is carried out in the manner described in Example 26 except that there are used, in place of the 1.4 parts of glyoxal, equivalent amounts of the aldehyde OHC—Z—CHO, wherein Z has the meanings given in column 2 of the following Table, there are obtained vat dyes of the formula

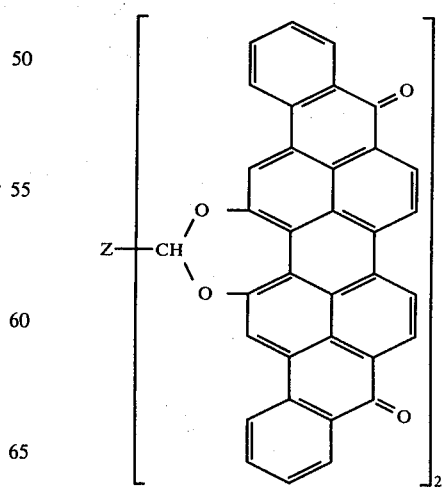

These dye cotton in the shade given in column 3.

TABLE

| Example | Z | Shade on cotton |
|---|---|---|
| 27 |  | navy blue |
| 28 |  | navy blue |
| 29 | 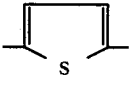 | navy blue |
| 30 | 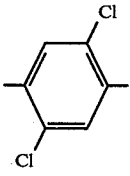 | navy blue |
| 31 | —CH₂—CH₂— | navy blue |

EXAMPLE 32

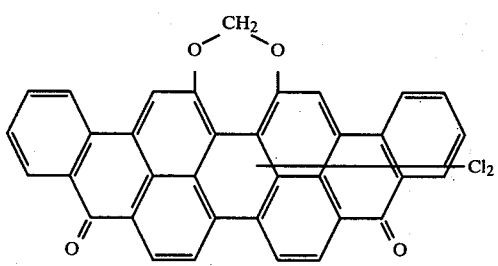

49 parts of dihydroxydibenzanthrone are introduced portionwise into 180 parts of chlorosulfonic acid at 5° C. in a manner ensuring that the temperature does not exceed 10° C. (about 20 minutes); and 15 parts of formaldehyde/dimethyl acetal are then added at such a rate that the temperature does not rise above 20° C. (about 15 minutes). The suspension is stirred at room temperature for 1 hour, and 2 parts of iodine are then added; there are subsequently introduced at room temperature 15 parts of chlorine (about 1 hour), and the suspension is afterwards poured into an ice/water mixture. The dye which has precipitated is filtered off, washed neutral with water, and dried at 80° C. in a vacuum drying chamber. The yield is 56 parts of a dye of the structure shown above, which dyes cotton in a navy blue shade.

Analysis: chlorine: calculated: 12.65%; found: 12.28%.

EXAMPLE 33

When the procedure is carried out as in Example 32 except that 7.5 parts of chlorine are introduced instead of 15 parts, there are obtained 53 parts of the dye of the formula

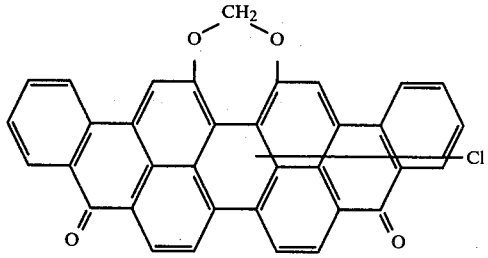

which dyes cotton in a navy blue shade.

Analysis: chlorine: calculated: 6.75%; found: 6.90%.

EXAMPLE 34

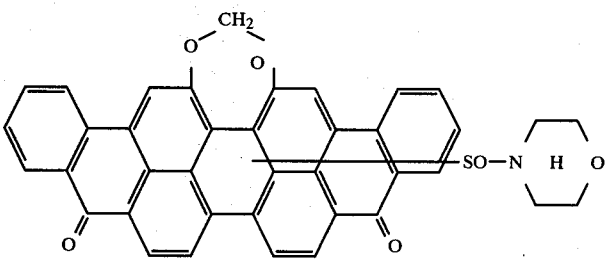

49 parts of dihydroxydibenzanthrone are introduced portionwise into 180 parts of chlorosulfonic acid at 5° C. in a manner ensuring that the temperature does not exceed 10° C. (about 20 minutes); and 15 parts of formaldehyde/dimethyl acetal are added dropwise at a rate which prevents the temperature rising above 20° C. (about 15 minutes). The suspension is stirred at room temperature for 1 hour, and 70 parts of chlorosulfonic acid and 15 parts of thionyl chloride are then added. The suspension is heated to 60° to 65° C., stirred for 2 hours at 60° to 65° C., afterwards left to cool to room temperature, and subsequently poured onto ice. The dye which precipitates is filtered off and washed until neutral with ice/water. The suction-filter residue is suspended in an ice/water mixture, and at 0° to 5° C. there are added dropwise, within 2 hours, 30 parts of morpholine. The mixture is then heated to 60° C., and stirred for 2 hours at 60° to 65° C. The suspension is subsequently filtered, the residue is washed neutral with water, and finally dried at 80° C. in a vacuum drying chamber. The yield is 60 parts of a dye of the structure given above, which dyes cotton in a blue shade.

Analysis: nitrogen: calculated: 2.15%; found: 2.00%; sulfur: calculated: 4.93%; found: 4.90%.

EXAMPLES 35 TO 48

If the procedure is carried out as in Example 34 except that there are used, instead of 30 parts of morpholine, equivalent amounts of the amine H-T, where T has the meanings listed in column 2 of the following Table, there are obtained vat dyes of the formula

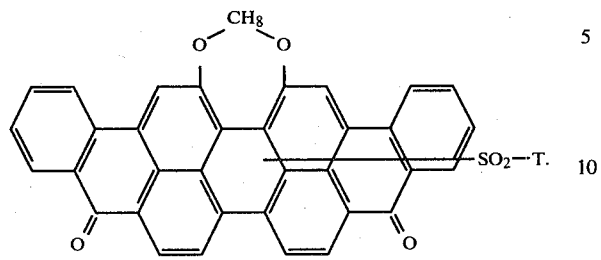

These dyes dye cotton, by the customary dyeing methods for vat dyes, in navy blue shades.

TABLE

| Example | T |
|---|---|
| 35 | —N(CH₃)—C₆H₅ (phenyl-N-methyl) |
| 36 | —NH—CH₂—CH(CH₃)₂ |
| 37 | —N(C₂H₅)₂ |
| 38 | —HN—(CH₂)₄—CH₃ |
| 39 | —HN—(CH₂)₂—OCH₃ |
| 40 | —HN—(CH₂)₃—OCH₂CH₃ |
| 41 | —HN—C₆H₅ |
| 42 | —HN—C₆H₄—Cl |
| 43 | —HN—C₆H₄—CH₃ |
| 44 | —HN—C₆H₄—OCH₃ |

TABLE-continued

| Example | T |
|---|---|
| 45 | —N(C₂H₅)(C₆H₅) |
| 46 | —N(piperidino) |
| 47 | —N(CH₂C₆H₅)—CH(CH₃)₂ (isopropyl-benzyl-amino) |
| 48 | —N(CH₃)₂ |

EXAMPLE 49

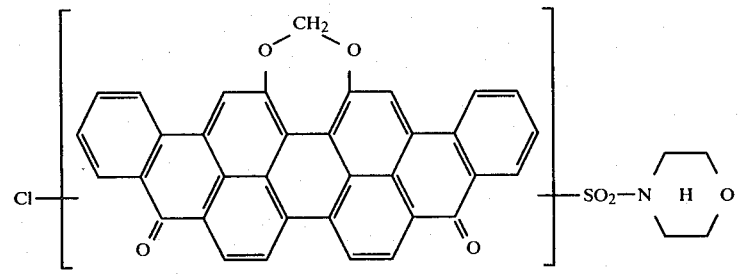

49 parts of dihydroxydibenzanthrone are introduced portionwise into 180 parts of chlorosulfonic acid at 5° C. in a manner ensuring that the temperature does not exceed 10° C. (about 20 minutes); and 15 parts of formaldehyde/dimethyl acetal are added dropwise at a rate which prevents the temperature from rising above 20° C. (about 15 minutes). The suspension is stirred at room temperature for 1 hour, and 1 part of iodine is then added; there are subsequently introduced at room temperature 5 parts of chlorine (about 1 hour), and 100 parts of chlorosulfonic acid and 15 parts of thionyl chloride are added. The suspension is heated to 60° to 65° C., and is stirred for 2 hours at 60° to 65° C.; it is afterwards left to cool to room temperature, and then poured onto ice. The dye which has precipitated is filtered off, and washed neutral with ice/water. The suction-filter residue is now suspended in an ice/water mixture, and at 0° to 5° C. are added dropwise 30 parts of morpholine within 2 hours. The temperature is thereupon raised to 60° C., and stirring is maintained for 2 hours at 60° to 65° C. The suspension is then filtered, and the residue is washed neutral with water, and finally dried at 80° C. in a vacuum drying chamber. The yield is 62 parts of the dye of the structure given above, which dyes cotton in blue shades.

Analysis: nitrogen: calculated: 2.05%; found: 1.60%, sulfur: calculated: 4.69%; found: 4.20%, chlorine: calculated: 5.18%; found: 4.70%.

DYEING INSTRUCTIONS 1 part of dye is stirred up with 10 parts by volume of sodium hydroxide solution of 36° Bé and 5 parts of sodium hydrosulfite in 200 parts of water at 50° to 70° C. This stock vat is added to a dye bath containing, in 2000 parts of water, 5 parts by volume of sodium hydroxide solution of 36° é and 3.7 parts of sodium hydrosulfite; and at 40° C. are introduced 100 parts of cotton. After 10 minutes, 15 parts of sodium chloride are added, after 20 minutes a further 15 parts, and dyeing is performed at 40° C. for 45 minutes. The cotton material is subsequently squeezed out, oxidised, and finished in the customary manner.

PIGMENT DYEING 5 parts of the dye are mixed with 95 parts of dioctylphthalate, and the mixture is ground in a ball mill until the dye particles are smaller than 3 μm. 0.8 part of this dioctylphthalate paste is mixed with 13 parts of polyvinyl chloride, 7 parts of dioctylphthalate and 0.1 part of cadmium stearate, and the mixture is thereupon rolled out for 5 minutes at 140° C. on a two-roller mill. A dyed material having good migration properties and good fastness to light is obtained.

LACQUER DYEING 10 g of titanium dioxide and 2 g of dye are ground for 48 hours in a ball mill with a mixture of 26.4 g of coconut alkyd resin, 24.0 g of melamine-formaldehyde resin (50% solids content), 8.8 g of ethylene glycol monomethyl ether and 28.8 g of xylene. When this lacquer is sprayed onto an aluminum sheet, predried for 30 minutes at room temperature and then stoved at 120° C. for 30 minutes, there is obtained a lacquer coating which is distinguished by a good depth of colour, good fastness to crosslacquering, excellent fastness to light and good fastness to weather.

What is claimed is:

1. A process for producing a vat dye of the formula I

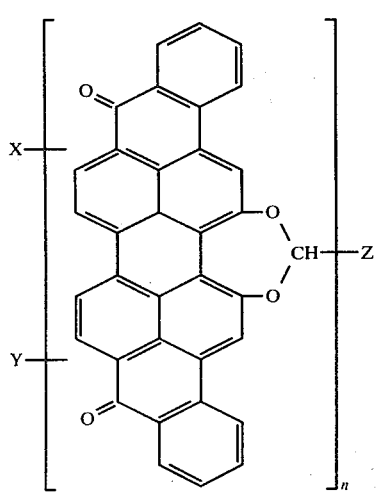

wherein
n is 1 or 2,
Z is H, unsubstituted or substituted alkyl, unsubstituted or substituted aryl or a heterocyclic radical, when n is 1, or a direct bond, unsubstituted or substituted alkylene, unsubstituted or substituted arylene or a heterocyclic radical, when n is 2,
X is H, Cl or a group of the formula $-SO_2T$, where T is the radical of an aliphatic or aromatic, primary or secondary amine, and
Y is H or Cl, which process comprises condensing n equivalents of dihydroxydibenzanthrone of the formula II

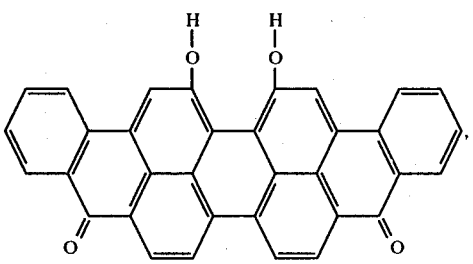

in chlorosulfonic acid, with an aldehyde of the formula III $$Z-(CHO)_n \qquad (III)$$

wherein Z and n have the meanings defined above, and subsequently, if dyes of the formula I in which X and/or Y are (is) not hydrogen are being produced, chlorinating the reaction product and/or reacting it with thionyl chloride and an amine of the formula IV $$H-T \qquad (IV),$$

where T has the meaning defined above.

2. A process according to claim 1, wherein a starting material is a compound of the formula III in which n is 1, and Z is hydrogen, $C_1-C_3$-alkyl, phenyl, or phenyl substituted by methyl, chlorine, nitro, sulfo or amino.

3. A process according to claim 1, wherein a starting material is a compound of the formula III in which n is 2, and Z is the direct bond, 1,3- or 1,4-phenylene or 2,5-thiophenylene.

4. A process according to claim 1, wherein a starting material is a compound of the formula IV in which H—T is dimethyl- or diethylamine, piperidine, morpholine, aniline, $C_1-C_3$-N-alkylaniline, or aniline monosubstituted in the phenyl ring by chlorine, methyl or methoxy.

5. A process according to claim 1 for producing a vat dye of the formula V

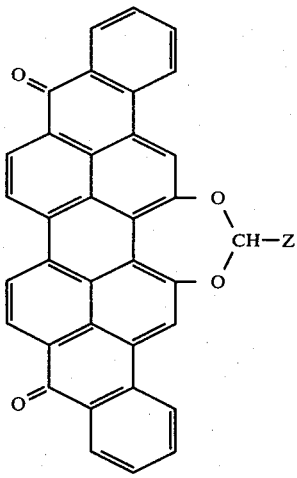

wherein Z is hydrogen, $C_1$-$C_3$-alkyl or phenyl, or phenyl substituted by methyl, chlorine, nitro, sulfo or amino, which process comprises reacting dihydroxydibenzanthrone of the formula II

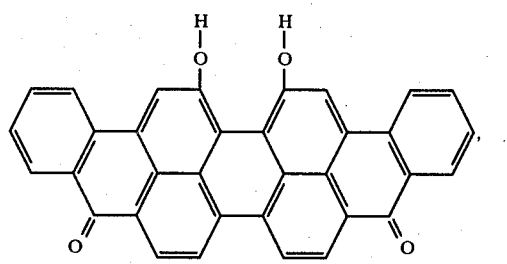

in chlorosulfonic acid, with an aldehyde of the formula VI

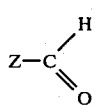

in which Z has the meaning defined above.

6. A process according to claim 1 for producing a vat dye of the formula VII

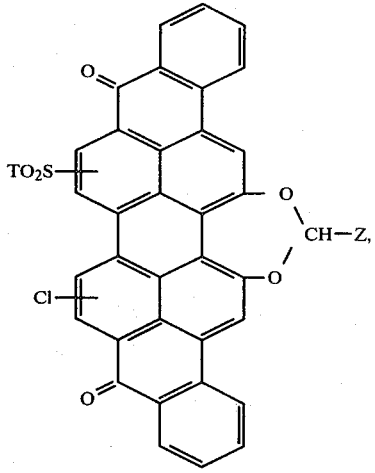

wherein Z is hydrogen, $C_1$-$C_3$-alkyl or phenyl, or phenyl substituted by methyl, chlorine, nitro, sulfo or amino, and T is the radical of dimethyl- or diethylamine, or piperidine, morpholine, aniline or $C_1$-$C_3$-N-alkylaniline, or aniline monosubstituted in the phenyl ring by chlorine, methyl or methoxy, which process comprises reacting dihydroxydibenzanthrone of the formula II

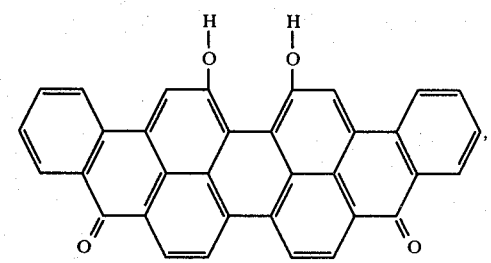

in chlorosulfonic acid, with an aldehyde of the formula VI,

wherein Z has the meaning defined above, and, simultaneously or successively in any sequence, subsequently chlorinating the reaction product and reacting it with thionyl chloride, and finally reacting the product obtained with dimethyl- or diethylamine, piperidine, morpholine, aniline, $C_1$-$C_3$-N-alkylaniline, or aniline monosubstituted in the phenyl ring by chlorine, methyl or methoxy.

7. A process according to claim 1, wherein dihydroxydibenzanthrone of the formula II is introduced into the 3- to 4-fold amount of chlorosulfonic acid, and subsequently an approximately equivalent amount of aldehyde is slowly added, the reaction temperature being kept between 0° and 30° C., preferably between 5° and 20° C.

8. A process according to claim 1, wherein chlorination is performed at 10° to 25° C. with chlorine in the presence of catalytic amounts of iodine.

9. A process according to claim 1, wherein the reaction with thionyl chloride, and the reaction between the formed dye sulfochloride and amine are performed at 40° to 90° C., preferably between 55° and 70° C., 2.0 to 2.5 mols of amine being used per mol of dye sulfochloride.

10. A process according to claim 1, wherein the condensation of dihydroxydibenzanthrone, the chlorination and the sulfochlorination are performed without isolation of the intermediates.

* * * * *